US009162679B2

(12) United States Patent
Sujan et al.

(10) Patent No.: US 9,162,679 B2
(45) Date of Patent: Oct. 20, 2015

(54) SYSTEM AND METHOD OF VEHICLE OPERATING CONDITION MANAGEMENT

(75) Inventors: Vivek A. Sujan, Columbus, IN (US);
Phani Vajapeyazula, Columbus, IN (US); Kenneth Follen, Greenwood, IN (US); An Wu, Columbus, IN (US);
Barty L. Moffett, Seymour, IN (US)

(73) Assignee: CUMMINS INTELLECTUAL PROPERTY, INC., Minneapolis, MN (US)

( * ) Notice: Subject to any disclaimer, the term of this patent is extended or adjusted under 35 U.S.C. 154(b) by 7 days.

(21) Appl. No.: 13/336,959

(22) Filed: Dec. 23, 2011

(65) Prior Publication Data

US 2012/0197501 A1 Aug. 2, 2012

Related U.S. Application Data

(60) Provisional application No. 61/426,988, filed on Dec. 23, 2010, provisional application No. 61/432,736, filed on Jan. 14, 2011.

(51) Int. Cl.
| | |
|---|---|
| *B60W 30/00* | (2006.01) |
| *B60W 30/188* | (2012.01) |
| *B60K 23/00* | (2006.01) |
| *B60K 31/00* | (2006.01) |
| *B60W 10/06* | (2006.01) |
| *B60W 10/11* | (2012.01) |

(52) U.S. Cl.
CPC ............ *B60W 30/1882* (2013.01); *B60K 23/00* (2013.01); *B60K 31/00* (2013.01); *B60W 10/06* (2013.01); *B60W 10/11* (2013.01); *B60W 2550/00* (2013.01); *B60W 2550/14* (2013.01)

(58) Field of Classification Search
CPC ... F16H 61/0213; F16H 61/061; F16H 59/44; B60W 10/06; B60W 10/11
USPC ......... 701/41, 96, 93, 84, 70, 66, 65, 51, 123, 701/1, 2, 22, 14, 19, 31.4; 477/43, 154, 3, 477/47; 340/944
See application file for complete search history.

(56) References Cited

U.S. PATENT DOCUMENTS

| | | |
|---|---|---|
| 4,368,509 A | 1/1983 | Li |
| 4,459,671 A | 7/1984 | Teass et al. |

(Continued)

OTHER PUBLICATIONS

Notification of Transmittal of the International Search Report and the Written Opinion of the International Searching Authority, or the Declaration mailed on Apr. 13, 2012; International Application No. PCT/US2011/067271.

*Primary Examiner* — Helal A Algahaim
*Assistant Examiner* — Jelani Smith
(74) *Attorney, Agent, or Firm* — Foley & Lardner LLP

(57) ABSTRACT

A vehicle operating condition profile can be determined over a given route while also considering imposed constraints such as deviation from time targets, deviation from maximum governed speed limits, etc. Given current vehicle speed, engine state and transmission state, the present disclosure optimally manages the engine map and transmission to provide a recommended vehicle operating condition that optimizes fuel consumption in transitioning from one vehicle state to a target state. Exemplary embodiments provide for offline and online optimizations relative to fuel consumption. The benefit is increased freight efficiency in transporting cargo from source to destination by minimizing fuel consumption and maintaining drivability.

22 Claims, 3 Drawing Sheets

(56) References Cited

U.S. PATENT DOCUMENTS

| | | |
|---|---|---|
| 5,231,897 A | 8/1993 | Morita |
| 5,394,331 A | 2/1995 | Dudek et al. |
| 5,598,335 A | 1/1997 | You |
| 5,839,533 A | 11/1998 | Mikami et al. |
| 5,954,781 A | 9/1999 | Slepian et al. |
| 6,038,505 A | 3/2000 | Probst et al. |
| 6,154,658 A | 11/2000 | Caci |
| 6,349,253 B1* | 2/2002 | Bellinger ................ 701/53 |
| 6,356,831 B1 | 3/2002 | Michelini et al. |
| 6,374,173 B1 | 4/2002 | Ehlbeck |
| 6,990,401 B2 | 1/2006 | Neiss et al. |
| 7,742,867 B2 | 6/2010 | Liu et al. |
| 7,849,031 B2 | 12/2010 | Stehle et al. |
| 8,768,543 B2* | 7/2014 | Kumar et al. ............ 701/19 |
| 2003/0160455 A1 | 8/2003 | Hu et al. |
| 2004/0002806 A1* | 1/2004 | Bellinger ................ 701/104 |
| 2004/0189722 A1* | 9/2004 | Acres ................ 345/866 |
| 2004/0224577 A1 | 11/2004 | Kaji |
| 2004/0239488 A1 | 12/2004 | Douglass, Jr. et al. |
| 2005/0090940 A1 | 4/2005 | Pajakowski et al. |
| 2005/0274553 A1 | 12/2005 | Salman et al. |
| 2006/0119507 A1 | 6/2006 | Cawse |
| 2006/0185626 A1 | 8/2006 | Allen et al. |
| 2007/0106442 A1 | 5/2007 | Lu |
| 2007/0112475 A1 | 5/2007 | Koebler et al. |
| 2007/0186669 A1 | 8/2007 | Cunningham |
| 2008/0027639 A1 | 1/2008 | Tryon |
| 2008/0059036 A1 | 3/2008 | Imai et al. |
| 2008/0125265 A1 | 5/2008 | Conlon et al. |
| 2008/0208393 A1 | 8/2008 | Schricker |
| 2008/0249667 A1 | 10/2008 | Horvitz |
| 2008/0254937 A1 | 10/2008 | Makiyama |
| 2008/0262712 A1 | 10/2008 | Duty et al. |
| 2009/0005974 A1 | 1/2009 | Lenneman et al. |
| 2009/0082957 A1 | 3/2009 | Agassi et al. |
| 2009/0118918 A1 | 5/2009 | Heap et al. |
| 2009/0204245 A1 | 8/2009 | Sustaeta et al. |
| 2009/0276267 A1 | 11/2009 | Padan |
| 2009/0319126 A1* | 12/2009 | Miyajima et al. ............... 701/41 |
| 2010/0010732 A1 | 1/2010 | Hartman |
| 2010/0023190 A1 | 1/2010 | Kumar et al. |
| 2010/0228404 A1 | 9/2010 | Link, II et al. |
| 2010/0287073 A1 | 11/2010 | Kocis et al. |
| 2010/0318273 A1 | 12/2010 | Aleksic et al. |
| 2011/0040438 A1* | 2/2011 | Kluge et al. ............ 701/29 |
| 2011/0202216 A1* | 8/2011 | Thai-Tang et al. ........... 701/22 |
| 2011/0257869 A1 | 10/2011 | Kumar et al. |
| 2011/0313647 A1* | 12/2011 | Koebler et al. ............ 701/123 |
| 2012/0197504 A1 | 8/2012 | Sujan et al. |

\* cited by examiner

SYSTEM AND METHOD OF VEHICLE OPERATING CONDITION MANAGEMENT

CROSS-REFERENCE TO RELATED APPLICATION

This application claims the benefit of U.S. Provisional Application Nos. 61/426,988, filed Dec. 23, 2010, and 61/432,736, filed Jan. 14, 2011, each of which is hereby incorporated by reference in their entirety.

STATEMENT REGARDING FEDERALLY SPONSORED RESEARCH OR DEVELOPMENT

This invention was made with government support under "Recovery Act-System Level Demonstration of Highly Efficient and Clean, Diesel Powered Class 8 Trucks (Supertruck)," Program Award Number DE-EE0003403 awarded by the Department of Energy (DOE). The government has certain rights in the invention.

TECHNICAL FIELD

This disclosure relates to the economization of fuel consumption during vehicle operation. More particularly, this disclosure relates to balancing vehicle speed targets and gear selection to optimize fuel consumption.

BACKGROUND

As a vehicle traverses a given route, fuel economy can be significantly influenced by the way an operator selects vehicle speed. An aggressive operator that creates rapid transitions in speed while maintaining the maximum allowable speed limit through the route (legal, fleet owner imposed, etc.), will likely not achieve the maximum fuel economy potential of the route. Generally, vehicle operators rely upon speedometers and tachometers to inform themselves of their vehicle's current operating condition, with fuel purchase patterns providing some measure of economy. Speed regulating systems are occasionally employed that compare actual vehicle speed to pre-set values and such systems can be somewhat effective in monitoring and controlling vehicle performance over a given course. These speed regulating systems generally allow a vehicle operator to select a set-speed, and the system monitors actual vehicle speed in relation to the set-speed, controlling engine performance in order to maintain actual vehicle speed at the set-speed. Speed regulation is effectuated by regulating fuel flow to the vehicle's engine by detecting deviation from the set-speed and adjusting the fuel flow to reduce or eliminate the deviation. If the speed regulating system detects an under-speed condition, such as might occur while the vehicle traverses up a hill, the system commands an increase in fuel flow to increase vehicle speed. Alternatively, if the system detects an over-speed condition, such as might occur while the vehicle traverses down a hill, the system commands a decrease in fuel flow to decrease vehicle speed.

SUMMARY

According to some embodiments of the present disclosure, a method is provided for vehicle operating condition management for a vehicle. The method includes accessing predetermined vehicle parameter data indicative of at least one predetermined vehicle parameter, the at least one predetermined vehicle parameter including at least one of vehicle mass, vehicle drag, vehicle rolling resistance, tire circumference, front area of vehicle, powertrain torque loss, and engine friction. The method further includes accessing road terrain data indicative of at least one road terrain element, the at least one road terrain element including at least one of speed limit changes, off ramp locations, fueling locations, road grade, air density and traffic congestion. The method further includes performing a first optimization wherein one or more vehicle optimization vectors are determined. The method additionally includes accessing current vehicle operating data indicative of at least one current vehicle operating condition, said at least one current vehicle operating condition including current vehicle speed, a lower vehicle speed target to be reached, travel time, and a distance to travel before reaching the lower vehicle speed target. And the method includes accessing the offline vehicle optimization vectors, determining vehicle power, and performing a second optimization wherein an optimized vehicle operating condition is determined, said the optimized vehicle operating condition comprising vehicle speed, the determining vehicle power being based on the current vehicle operating condition data and the terrain element data.

According to other embodiments of the present disclosure, a system is provided for vehicle operating condition management for a vehicle. The system includes a vehicle parameter module containing data indicative of at least one predetermined vehicle parameter, the at least one predetermined vehicle parameter including at least one of vehicle mass, vehicle drag, vehicle rolling resistance, tire circumference, front area of vehicle, powertrain torque loss, and engine friction. The system further includes a road terrain element module containing data indicative of at least one road terrain element, the at least one road terrain element including at least one of speed limit changes, off ramp locations, fueling locations, road grade, air density and traffic congestion. The system additionally includes a vehicle operating condition module containing data indicative of at least one current vehicle operating condition, the at least one current vehicle operating condition including current vehicle speed, lower vehicle speed target to be reached, travel time, and distance to travel before reaching lower vehicle speed target to be reached. And the system includes a vehicle operating condition management module adapted to perform a first optimization wherein one or more vehicle optimization vectors are determined, determine vehicle power based on the current vehicle operating condition data and the road terrain element data, and perform a second optimization wherein an optimized vehicle operating condition is determined, the optimized vehicle operating condition comprising vehicle speed.

Additional embodiments of the present disclosure provide a system and method for vehicle operating condition management to be implemented in computer programmable software and stored in computer readable media.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and/or other exemplary features and advantages of the preferred embodiments of the present disclosure will become more apparent through the detailed description of exemplary embodiments thereof with reference to the accompanying drawings, in which.

Throughout the drawings, like reference numbers and labels should be understood to refer to like elements, features, and structures.

DETAILED DESCRIPTION

Exemplary embodiments of the present disclosure will now be described more fully with reference to the accompanying drawings. The matters exemplified in this description are provided to assist in a comprehensive understanding of various embodiments disclosed with reference to the accompanying figures. Accordingly, those of ordinary skill in the art will recognize that various changes and modifications of the embodiments described herein can be made without departing from the scope and spirit of the claimed inventions. Descriptions of well-known functions and constructions are omitted for clarity and conciseness. To aid in clarity of description, the terms "upper," "lower," "above," "below," "left" and "right," as used herein, provide reference with respect to orientation of the accompanying drawings and are not intended to be limiting.

In situations where a change in vehicle speed may occur, such as when approaching a speed limit change, road egress, traffic light or slowed traffic pattern, prior knowledge of the impending change can be used to minimize fuel consumption. Exemplary embodiments of the systems and methods of the present disclosure are directed to determine appropriate vehicle operating condition references (such as target speed and gear references) to maximize the fuel economy potential of the vehicle over a given route while also considering imposed constraints such as route traverse time targets, maximum governed speed limits, etc. Given a recommended vehicle speed target, current vehicle speed, engine state and transmission state, the present disclosure manages the engine map and transmission to provide a recommended vehicle operating condition that optimizes fuel consumption in transitioning from one vehicle state to a target state. One benefit of optimizing fuel management is increased freight efficiency in transporting cargo from source to destination.

To assist in the determination of appropriate operating condition references, applicants introduce a Cycle Efficiency Management (CEM) module that employs control processes to furnish an operator with anticipated and currently desired vehicle operational behavior to optimize fuel economy. The CEM control processes focus on powertrain components such as engine, transmission, accessories, final drive, wheels and vehicle. The processes interface with the operator to provide guidance as to appropriate vehicle speed/power targets and transmission gear selection targets. The CEM module is useful in conditioning an operator to optimize behavior based on certain performance criteria.

Figure 1:
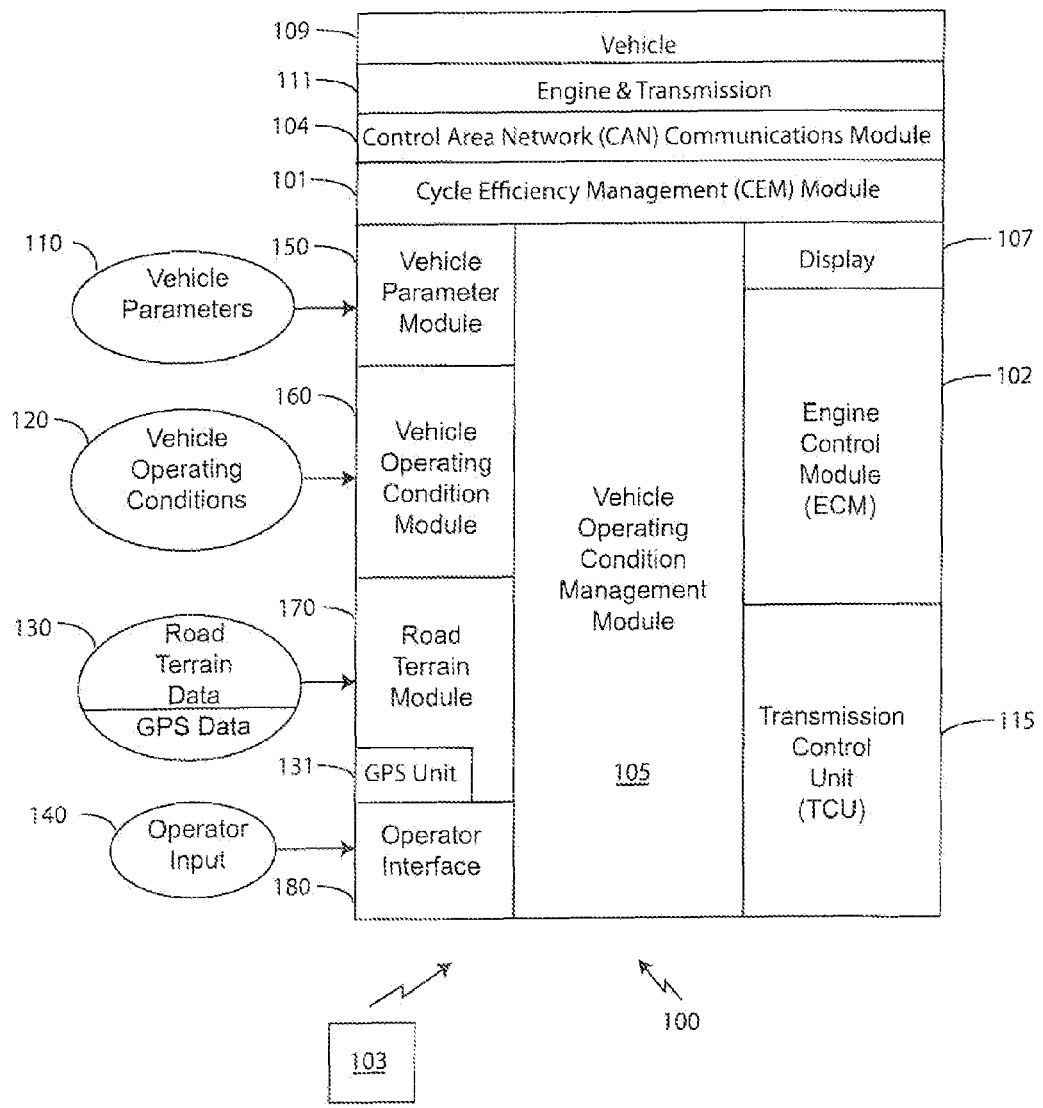
FIG. 1 is a system diagram for a vehicle operating condition management system in accordance with an exemplary embodiment of the present disclosure.

FIG. 1 is a system diagram for a vehicle operating condition management system 100 in accordance with an exemplary embodiment of the systems and methods of the present disclosure. System 100 is integrated into a vehicle 109, such as a truck or automobile, having an engine and transmission 111 including a plurality of gears into which the transmission can be shifted automatically by a transmission control unit 115 or manually by a driver of the vehicle. Generally, predetermined vehicle parameters 110, current vehicle operating conditions 120, and terrain profile data/information 130 are input into a CEM module 101 via control area network (CAN) communications module 104 and then used by a vehicle operating condition management module 105 to determine a recommendation for a vehicle operating condition, such as establishing vehicle speed and transmission gear. The recommendation to change vehicle operating condition is based on an expected forthcoming change in a vehicle speed event and communicated to the vehicle operator and/or the vehicle systems, such as, for example, the vehicle engine control module and vehicle transmission. In addition to other components, CEM module 101 contains vehicle operating condition management module 105, and may also include a central processor and database. Communication equipment/modules 104 can be provided to enable input data, such as road terrain data, to be transmitted to the central processor for monitoring and control. CEM module 101 may include a vehicle parameter module 150 adapted to receive vehicle parameters 110, a vehicle operating condition module 160 adapted to receive current vehicle operating conditions 120, a road terrain module 170 adapted to receive road terrain element data 130 and an operator interface 180 to receive optional operator input 140. Exemplary embodiments provide for at least a portion of the road terrain data to be provided as GPS data to a GPS unit 131, which can supply data in advance of an operation or forthcoming positions or in real-time as the vehicle is operated and route traversed. Alternate embodiments provide for road terrain data to be maintained in computer storage 103 and downloaded to the CEM module prior to the start of a trip or transmitted wirelessly over-the-air at any time, for example, by using cellular technology. The CEM module 101 enables operator input 140 in order to provide a degree of control for vehicle operators and thus improve driveability. In operation, the operator programs one or more preferences for how they desire the vehicle to behave during the course of the route. Using this control mode, the operator can, amongst other things, specify such preferences as travel time 224 desired to traverse the route, distance to use in acquiring current vehicle operating conditions (distance interval), upper speed limit 225, and lower speed target or limit 223. Exemplary embodiments provide for managing the vehicle operating condition to optimize fuel consumption given the travel time constraint. Exemplary embodiments provide for the operator to specify preferences via display 107 that is adapted to, amongst other things, indicate optimized vehicle operating conditions to a vehicle operator. Exemplary embodiments provide for an engine control module (ECM) 102 to be separate from the CEM module 101; alternate embodiments provide for the CEM module 101 and the ECM 102 to form an integrated unit. Likewise, modules 150, 160, 170, and 180 may be separate from CEM module 101.

Figure 2:
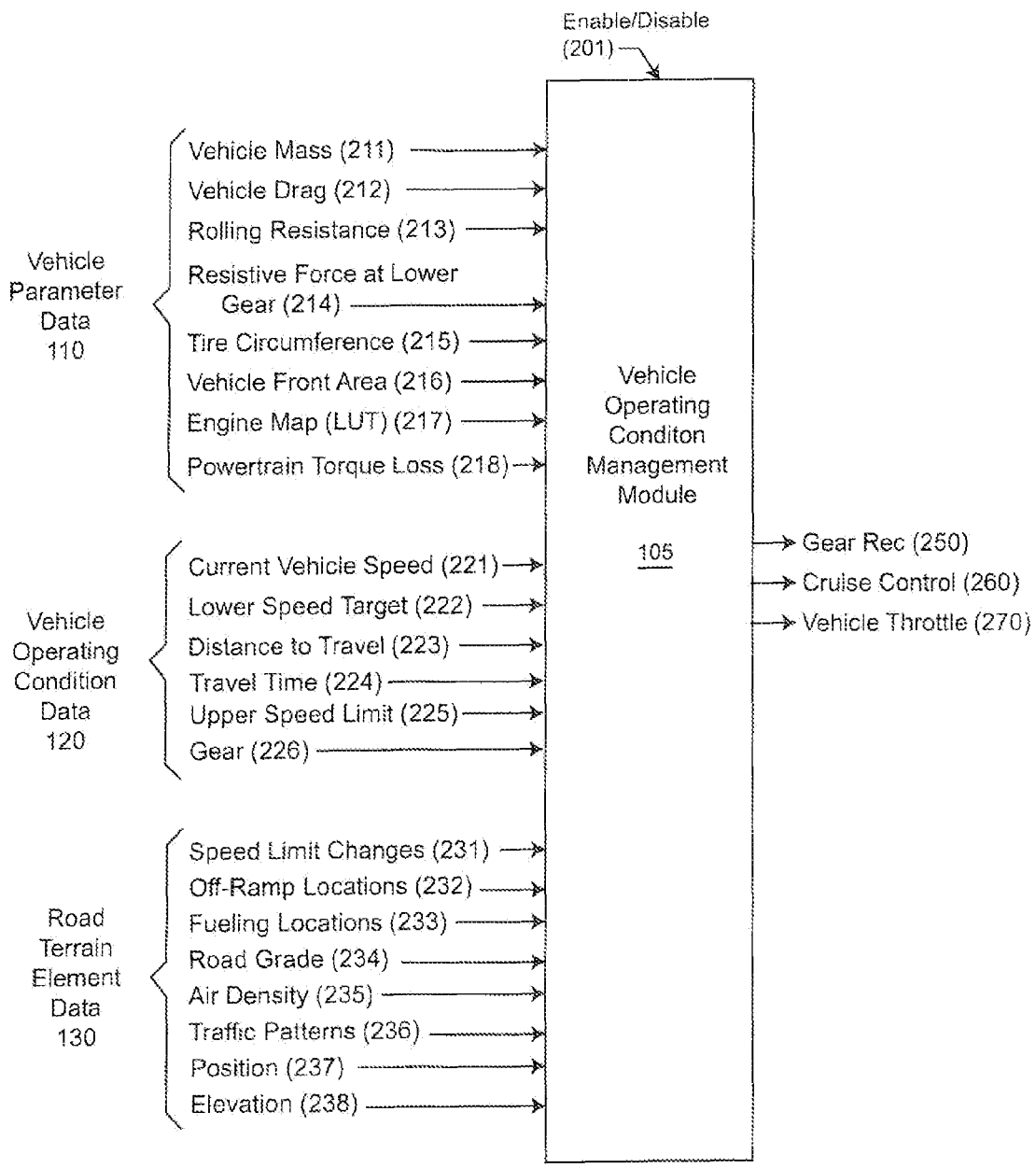
FIG. 2 is an input/output flow diagram for a vehicle operating condition management module in accordance with an exemplary embodiment.

FIG. 2 is an input/output flow diagram for a vehicle operating condition management module 105 in accordance with an exemplary embodiment of the systems and methods of the present disclosure. FIG. 2 illustrates system inputs to vehicle operating condition management module 105, which processes the inputs to determine the vehicle operating condition, which includes, amongst other things, a transmission gear recommendation 250 and/or a vehicle speed recommendation 260. System inputs are received by CEM module 101, which then enables vehicle operating condition management module 105 via an enable/disable signal 201. The enable/ disable signal 201 provides for disabling the vehicle operating condition management system in response to an operator-initiated event. Data indicative of at least one vehicle parameter 110 is received as an input to vehicle operating condition management module 105 via CEM module 101, for example, input to the vehicle parameter module 150. The vehicle parameter data 110 includes data signifying or representing, for example, vehicle mass 211, vehicle drag 212, vehicle rolling resistance 213, drive train resistive force at lower gear 214, tire circumference 215, vehicle front area 216, engine friction 217, powertrain torque loss 218, driveline ratio, and/or axle loading, which in exemplary embodiments provide three values corresponding to loading on the steer tire, drive tire and trailer tires. The driveline ratio comprises a secondary gearing used in mechanically coupling the transmission to the wheels and is available in certain but not all vehicles. When a driveline ratio is available then the ratio is considered by the downspeed coasting management module 105 in gearing recommendations communicated to the transmission control unit 115. Vehicle parameter data may include actual values of each of these parameters, such as a vehicle mass value, a drag value, and/or a rolling resistance value. Exemplary embodiments provide for engine friction data 217 to be supplied by an engine friction map look-up table (LUT) containing engine friction data obtained, for example, by engine performance measurements under various speed/torque combinations versus fuel consumed. The Engine friction map LUT embodies the relationship between engine torque, engine speed and engine fueling. Separate engine friction data is available for conditions when engine braking is enabled or when engine braking is disabled. Data indicative of at least one current vehicle operating condition 120 is also received as an input to the vehicle operating condition management module 105 via CEM module 101, for example, input to the vehicle operating condition module 160. The operating condition data 120 includes data signifying or representing current vehicle speed 221, a lower vehicle speed target to be reached 222, and a distance to travel 223 before reaching/achieving the lower vehicle speed target, travel or trip time 224, upper speed limit 225, and gear 226. Exemplary embodiments provide for vehicle operating condition data to be acquired via a vehicle monitoring and positional system, such as a GPS unit 131, and/or provided by the operator. Exemplary embodiments provide for operating condition and route terrain data to be dynamically acquired in real-time, or through "foresight" or look-ahead windows of a discrete distance, such as, for example, 2 miles. In acquiring operating condition and route terrain data in discrete segments, as the vehicle moves through a unit distance interval, informational data is acquired and the system updated to, amongst other things, correct for deviations from planned trip traversal, such as route deviations, changes in vehicle speed, changes in traffic patterns, etc. The window can be set at a predetermined default interval and/or can be adjustable by the operator. Window size is selected based upon desired data resolution and speed of processing. Data indicative of at least one road terrain element 130 is also received as an input to the vehicle operating condition management module 105 via CEM module 101, for example, to the road terrain module 170. The road terrain element data 130 includes data signifying or representing speed limit changes 231, off-ramp locations 232, fueling locations 233, road grade 234, air density 235, traffic patterns or congestion 236, position 237 and elevation 238. Exemplary embodiments provide for speed limit and road terrain data to be furnished by data vendors, such as, for example, E-Horizon™ and NAVTEQ Traffic™ systems; positional-based systems, such as a GPS, can provide data on vehicle position 237. Road terrain element data 130, such as route grade 234, elevation 238, speed limit changes 231 and fueling station locations 233 can be obtained ahead of time to provide a course snapshot of the entire route. Outputs from vehicle operating condition management module 105 include a determination of a recommended gear 250, recommended speed 260, and driver or operator score 270.

Figure 3:
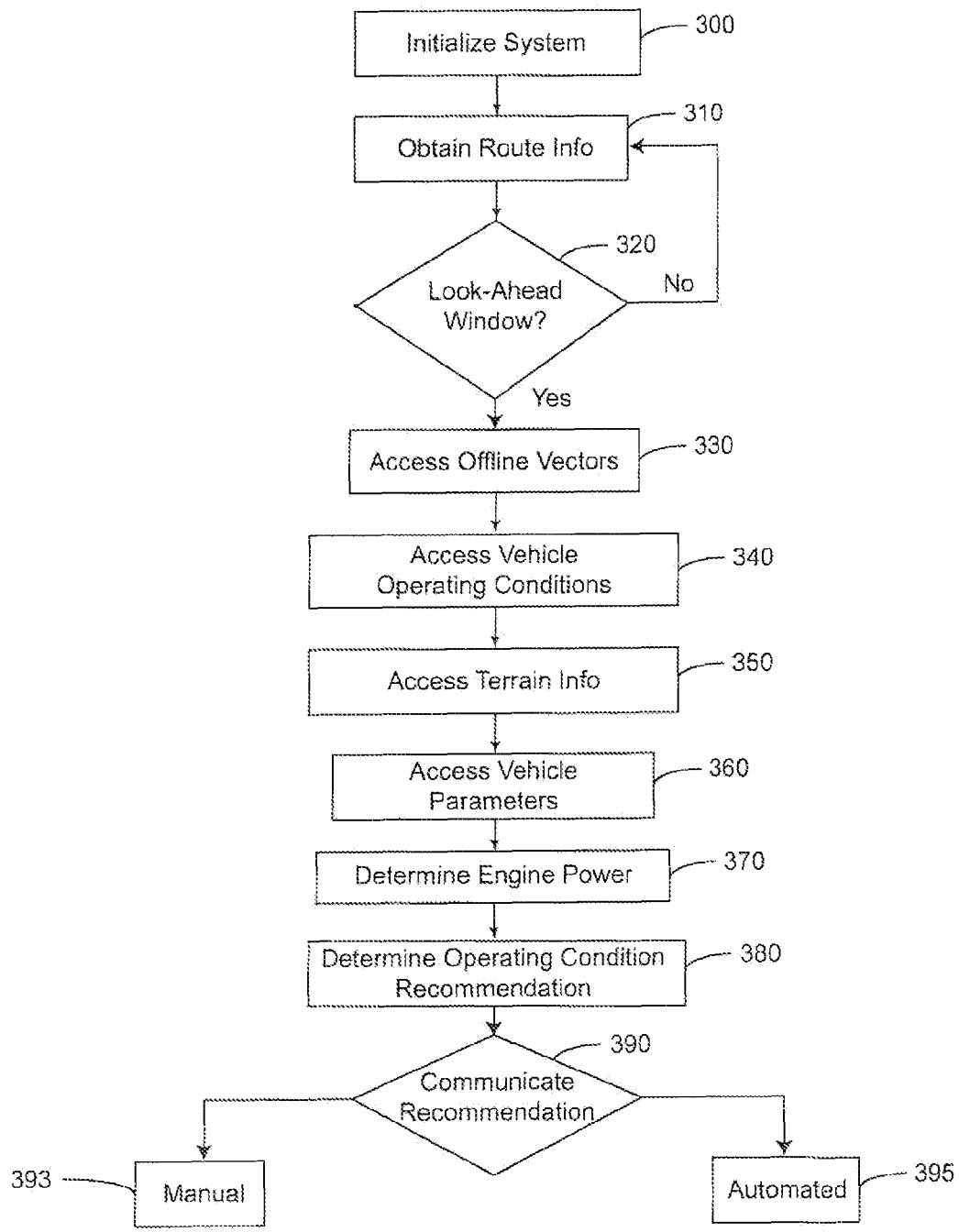
FIG. 3 is a flow diagram depicting method steps for vehicle operating condition management in accordance with an exemplary embodiment.

FIG. 3 is a flow diagram depicting the steps of a method for vehicle operating condition management in accordance with an exemplary embodiment. The method includes two steps: first, an offline, i.e., first, coarse evaluation and optimization is performed over the full drive cycle/route; then second, during drive cycle execution, fine-tuned refinements are periodically achieved using a moving look-ahead window during an online, i.e., second, optimization. Prior to deployment, the vehicle's operating condition management system 100 is initialized with known route and vehicle data, step 300. The system 100 can be initialized prior to the operator's arrival or initiated by an action by the operator, such as, for example, pressing a button on a user interface to start the optimization. An operator, or an external source such as a central database, supplies the vehicle with a trip destination and planned route and trip time; known road terrain element data 130 are acquired via the operator, a database, or data vendor, as described above. Exemplary embodiments provide for the operator to enter vehicle parameters 110 and preferences for how the vehicle should behave on the route. Alternatively, or in conjunction with operator entry, vehicle parameters can be provided by a database containing vehicle information. Further, road terrain element data 130, such as route grade 234, speed limit changes 231 and fueling station locations 233 can be obtained ahead of time to provide an offline snapshot of the entire route. The data is then processed in a first, offline optimization to provide an estimate of the full cycle travel time 224 and fuel economy, along with vehicle operating condition vectors comprising an optimized course route velocity and gear state references, that is, vehicle optimization vectors. Exemplary embodiments employ a weighting function in determining optimal speed to account for vehicle momentum during downhill and uphill sections of the route.

The offline optimization employs a representation of the vehicle, which in exemplary embodiments uses standard vehicle modeling known to those of ordinary skill in the art. One implementation employs a model wherein fuel consumption over a given route is described through differential-algebraic relationships that are a function of, amongst other things, vehicle velocity and acceleration, gear, route grade, vehicle powertrain and engine parameters. The model is optimized for lowest cost by minimizing an estimate of fuel consumption over the entire route using trip time 224 as an operating constraint. This cost optimized vehicle model (cost function) looks to select a vehicle speed and gear state as a function of the route in order to minimize fuel consumption. Exemplary embodiments minimize fuel consumption relative to vehicle speed and gear state by accessing an engine map.

Power demanded by a vehicle is a function, primarily, of the vehicle operating condition, which, among other things, includes vehicle mass, vehicle speed, rolling resistance and transmission gear, coupled with the instantaneous road conditions (grade, drag, wind speed, air density, etc.). For example, if either the speed or grade drops by traveling at a lower speed or going downhill, less power will be required for the vehicle to traverse a given distance. Accounting for system inefficiencies, power can be translated into engine torque and the vehicle's system of gears translates vehicle speed to engine speed. Thus, by knowing power demand and vehicle speed, an appropriate transmission gear can be identified, which when coupled with engine speed and torque, a particular point on the engine map can be identified. A change in engine speed location on the engine map will require a change in engine torque to achieve the same output power. And for a given point on the engine map, a certain amount of fuel will be required. Thus, by changing the engine speed and toque point we are changing how much fuel is needed to provide the same output power. From realizing where we want to be on the engine map, an equivalent vehicle speed and transmission gear choice can be back-calculated. Accordingly, minimization of fuel consumption can be realized by traversing the engine map to find the appropriate engine speed and torque combination to satisfy the power demand and minimizes fuel consumption. Exemplary embodiments employ mathematical techniques to identify the minimum value of the cost function in traversing the engine map. Such mathematical minimization techniques are known to those of ordinary skill in the art and can include, for example, techniques such as Steepest Descent, Non-linear Programming, Genetic Algorithms, etc.

Exemplary embodiments employ a continuously variable transmission (CVT) that can change steplessly through an infinite number of effective gear ratios; alternate embodiments employ a discrete geared transmission. The results of the offline optimization are stored as vehicle operating condition vectors (vehicle optimization vectors) comprising reference speed and transmission gear recommendations associated with the pre-planned route.

During travel, pre-planned routes are subject to operator change as road conditions, weather, traffic, and other unexpected situations arise that necessitate route deviation. Such deviations cause error in the offline optimization that was executed during system initialization, step 300. Deviations that impact vehicle speed, such as traffic patterns, are limiting conditions that are operationally akin to a speed limit constraint. To account for off-nominal deviations and other conditions that occur in real-time, the vehicle operating condition management system 105 employs an online, fine optimization process, an exemplary embodiment of which is as follows. As the vehicle is underway, route information is obtained, step 310, via a vehicle monitoring and positional system, such as a GPS unit 131, and/or provided by the operator. Such route information confirms data obtained previously according to the planned route during offline optimization (step 300) and provides a basis for correction during unplanned route deviations as the route is driven. Exemplary embodiments provide for speed limit and road terrain data to be furnished by data vendors, such as, for example, E-Horizon™ and NAVTEQ Traffic™ systems, as described above.

As the route is traversed, the vehicle operating condition management system 100 checks for the occurrence of a trip window, step 320, which is defined by a discrete distance. At each occurrence of a trip window the online optimization is performed. As discussed above, exemplary embodiments provide for operating condition and route terrain data to be dynamically acquired in real-time through "foresight" or look-ahead windows of a discrete distance, such as, for example, 2 miles. In acquiring operating condition and route terrain data in discrete segments as the vehicle moves through a unit distance, informational data is acquired and the system updated to, amongst other things, correct for deviations from the offline optimization. The size or distance of the look-ahead or trip window can be set at a default interval or adjustable by the operator. Window size is selected based upon the desired data resolution and speed of processing. Exemplary embodiments provide for offline optimization to run at a coarse distance resolution, for example, 0.5 miles, whereas the online optimization runs at a fine resolution, for example, 0.1 miles, within its defined look-ahead window.

The online optimization process receives data from the offline optimization process to satisfy the objective of minimizing fuel consumption under the trip time constraint, step 330. Exemplary embodiments provide for determining new vehicle operating condition vectors comprising velocity and gear profiles as a function of distance for the entire route as data within two vectors determined during the offline optimization, and which are determined in view of the engine map to minimize fuel consumption. For example, the velocity vector from the offline, coarse route is used to calculate the time required to travel the distance of a given "look-ahead" window during online optimization. Thus, each time the online optimization is performed it calculates a new velocity vector derived from the offline pre-planned route, thus ensuring that the trip time for the whole route will be satisfied. The online optimization is refreshed each time the defined "look-ahead" window distance is traversed. The online optimization employs a representation of the vehicle that follows that of the offline optimization and minimizes the cost function in a similar way, that is, by traversing the engine map. And as indicated above, the online optimization receives its data at a fine resolution over a discrete section of the route, that is, during the "look-ahead" window, within which the positional and road terrain information devices provide a stream of data that has been obtained in real-time. Outputs from the online optimization are recommended reference speed and transmission gear.

During an online optimization "look-ahead" window, data indicative of the current vehicle operating condition is accessed, step 340. Current vehicle operating conditions include, in addition travel time, the current vehicle speed, the lower speed target, the upper speed limit and current transmission gear. Exemplary embodiments provide for current vehicle speed to be obtained from instrumentation on the vehicle, such as, for example, a speedometer and/or a positional indicator, such as a GPS unit 131, which provides a measure of change relative to position over time. Data indicative of road terrain elements is accessed, step 350. Road terrain elements include, but are not limited to route grade, speed limit changes, off-ramp locations, fueling station locations, air density, traffic patterns, position and elevation. Data indicative of predetermined vehicle parameters is accessed, step 360. Predetermined vehicle parameters include, but are not limited to, vehicle mass, vehicle drag, vehicle rolling resistance, resistive force at lower gear, tire circumference, vehicle front area, and engine map. Data indicative of road terrain elements and predetermined vehicle parameters are obtained primarily during system initialization, step 300, but can be updated or changed at any time by the operator or via network communication, such as wireless over-the-air transmissions, and during online optimization.

During online optimization the power demand at the current state is determined, step 370. In exemplary embodiments, one of many formulations of power, as would be known to those of ordinary skill in the art, can be expressed as a function of vehicle velocity (v), air density (ρ), vehicle drag ($C_d$), vehicle front area (A), rolling resistance ($C_{rr}$), vehicle mass (m), gravitational acceleration (g), and road grade (g), provided by Equation I:

$$\text{Power} = \left\{ \frac{1}{2} \rho C_d A v^2 + C_{rr} mg\cos(\theta) + mg\sin(\theta) \right\} v \quad \text{Equation I}$$

Knowing power demand and vehicle speed, an appropriate transmission gear can be identified, which when coupled with engine speed and torque, determines a particular point on the engine map. As discussed above, by changing the engine speed and toque point we are changing how much fuel is needed to provide the same output power. By realizing where we want to be on the engine map, an equivalent vehicle speed and transmission gear choice can be back-calculated. Accordingly, minimization of fuel consumption can be realized by traversing the engine map to find the appropriate engine speed and torque to satisfy the power demand that minimizes fuel consumption, which is then translated into vehicle operating condition in terms of vehicle speed and gear, step 380. Thus, the online optimization determines new vehicle operating condition vectors over the engine map to minimize fuel consumption Outputs of the vehicle operating condition management module 105 include a determination of the vehicle operating condition, namely, a recommended gear 250, recommended speed 260, and driver or operator score 270. The driver score 270 provides a measure of how well the vehicle operator maintains the vehicle at the recommended speed and gear. The determined vehicle operating conditions can then be communicated to a receiver, such as transmission control unit 115 and/or display 107, to effect the operating condition change, step 390. Exemplary embodiments provide for generating an electronic recommendation signal corresponding to the recommended vehicle operating conditions. Certain embodiments provide for the recommendation signal to be communicated to a transmission control unit, step 395, for automated control of the transmission and engine control unit (ECU) 102; other embodiments provide for the recommendation signal to be communicated to the operator via display 107 to facilitate manual action by the operator, step 393. Display 107 can be a touch-screen interface for convenient data entry and is adapted to, amongst other things, indicate optimized vehicle operating conditions to a vehicle operator. Exemplary embodiments provide for alternate modes of feedback to the operator, including audio signals, haptic feedback through throttle pedal, gear shifter and/or cruise control switches. Exemplary embodiments provide for recommendations to be made to the operator concerning throttle and brake control; that is, the display can convey instructions such as "press throttle recommended" or "lift off throttle recommended" or "press brake recommended" or "lift off brake recommended" or "coast recommended." Exemplary embodiments provide for disabling the vehicle operating condition management system 100 in response to an operator-initiated event, such as, for example, as tapping the brakes or pressing the accelerator. Exemplary embodiments provide for module 105 to provide a recommendation for the operator to disable cruise control. This recommendation can be communicated via display 107. Disabling output signals include transmission gear, throttle and cruise control disable.

Occasionally it is not convenient for the vehicle operating condition management system 100 to access or gain control of the transmission gear system or transmission control unit. In such situations it is not feasible for the vehicle operating condition management system to provide a recommendation of the transmission gear. Exemplary embodiments provide for the vehicle operating condition management system to provide a recommendation of vehicle speed based on a fuel minimizing optimization that utilizes an engine map where speed is a variable of control. Alternate embodiments accommodate vehicles having manual transmissions. When the vehicle is operated with a manual transmission, the vehicle does not have a transmission control unit so there can be no automatic control of the transmission. In such an embodiment the recommended transmission gear is communicated to the operator via display 107 as discussed above.

Exemplary embodiments provide a system for vehicle operating condition management for a vehicle. The system includes a vehicle parameter module containing data indicative of at least one predetermined vehicle parameter, the at least one predetermined vehicle parameter including at least one of vehicle mass, vehicle drag, vehicle rolling resistance, resistive force at lower gear, tire circumference, front area of vehicle, powertrain torque loss, and engine friction. The system further includes a road terrain element module containing data indicative of at least one road terrain element, the at least one road terrain element including at least one of speed limit changes, off ramp locations, fueling locations, road grade, air density and traffic congestion. The system additionally includes a vehicle operating condition module containing data indicative of at least one current vehicle operating condition, the at least one current vehicle operating condition including current vehicle speed, lower vehicle speed target to be reached, travel time, and distance to travel before reaching lower vehicle speed target to be reached. And the system includes a vehicle operating condition management module adapted to perform a first optimization wherein one or more vehicle optimization vectors are determined, determine vehicle power based on the current vehicle operating condition data and the road terrain element data, and perform a second optimization wherein an optimized vehicle operating condition is determined, the optimized vehicle operating condition comprising vehicle speed.

Exemplary embodiments provide a system and method for vehicle operating condition management to be implemented in computer programmable software and stored in computer readable media. Such an embodiment would comprise a computer readable storage medium encoded with computer executable instructions, which, when executed by a processor, perform the method for vehicle operating condition management as disclosed above. Also, many aspects of the disclosure are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions (software), such as program modules, being executed by one or more processors, or by a combination of both. Moreover, the disclosure can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium would include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. It should be noted that the system of the present disclosure is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/ or software implemented to substantially perform their particular functions explained herein. The various functions of the different components can be combined or segregated as hardware and/or software modules in any manner, and can be useful separately or in combination. Thus, the various aspects of the disclosure may be embodied in many different forms, and all such forms are contemplated to be within the scope of the disclosure.

While various embodiments in accordance with the present disclosure have been shown and described, it is understood that the disclosure is not limited thereto. For example, the present disclosure manages the engine map and transmission to provide a recommended solution that optimizes fuel consumption in getting from one vehicle state to a target state. Other embodiments can be employed that optimize for maximum freight efficiency and other embodiments can be employed that optimize for minimum engine energy. Further, the present disclosure may be changed, modified and further applied by those skilled in the art. Therefore, this disclosure is not limited to the detail shown and described previously, but also includes all such changes and modifications.

We claim:

1. A vehicle operating condition management system comprising:
   a communication module configured to transmit vehicle operating condition data for a vehicle; and
   a cycle efficiency management module coupled to the communication module, the cycle efficiency management module configured to:
   access an engine map of the vehicle, the engine map including data corresponding to an engine speed and engine torque for the engine of the vehicle;
   predetermine a velocity profile to minimize fuel consumption of the vehicle for a route from a source to a destination, the velocity profile predetermined at least in part based on the accessed engine map and a determination of a transition grade, the velocity profile providing a plurality of velocity vectors, the velocity profile including a first uphill velocity that is slower than a first downhill velocity for grades below the transition grade and a second uphill velocity that is the same as a second downhill velocity for grades above the transition grade,
   cause the velocity profile to be stored,
   access the stored velocity profile during an execution of a drive cycle along the route by the vehicle, and based on receipt of route information obtained during the execution of the drive cycle along the route by the vehicle and based on the stored velocity profile, determine a new velocity vector for a discrete section of the route;
   wherein the communication module transmits vehicle operating condition data to one of a transmission control unit or a display based on the new velocity vector.

2. The system according to claim 1, wherein the velocity profile to minimize fuel consumption of the vehicle for a route from a source to a destination is with respect to a trip time and wherein the new velocity vector for the discrete section of the route is determined to satisfy the trip time to traverse the route.

3. The system according to claim 1, further comprising obtaining the route information at a plurality of intervals during the execution of the drive cycle along the route by the vehicle.

4. The system according to claim 1, wherein the velocity profile is predetermined based on one or more of: vehicle mass, vehicle drag, vehicle rolling resistance, resistive force at lower gear, tire circumference, and vehicle front area.

5. The system according to claim 1, wherein the route information includes road terrain elements.

6. The system according to claim 5, wherein the road terrain element include one or more of: route grade, speed limit changes, off-ramp locations, fueling station locations, air density, traffic patterns, position, and elevation.

7. The system according to claim 1, wherein the transmitted vehicle operating condition data comprises a recommendation based on the new velocity vector.

8. The system according to claim 1, wherein the recommendation includes a speed reference.

9. The system according to claim 1, wherein the recommendation includes a transmission gear.

10. The system according to claim 9, wherein the new velocity vector is determined based on current vehicle speed.

11. The system according to claim 9, wherein the new velocity vector is determined based on current transmission gear.

12. A method of managing a vehicle operating condition comprising:
    accessing an engine map of the vehicle, the engine map including data corresponding to an engine speed and engine torque for the engine of the vehicle;
    predetermining a velocity profile to minimize fuel consumption of the vehicle for a route from a source to a destination, the velocity profile predetermined at least in part based on the accessed engine map and a determination of a transition grade, the velocity profile providing a plurality of velocity vectors, the velocity profile including a first uphill velocity that is slower than a first downhill velocity for grades below the transition grade and a second uphill velocity that is the same as a second downhill velocity for grades above the transition grade;
    causing the velocity profile to be stored;
    accessing the stored velocity profile during an execution of a drive cycle along the route by the vehicle; and
    based on receipt of route information obtained during an execution of a drive cycle along the route by the vehicle and on the stored velocity profile, determining a new velocity vector for a discrete section of the route;
    transmitting vehicle operating condition data to one of a transmission control unit or a display based on the new velocity vector.

13. The method according to claim 12, wherein the velocity profile to minimize fuel consumption of the vehicle for a route from a source to a destination is with respect to a trip time and wherein determining the new velocity vector for the discrete section of the route includes determining the new velocity vector to satisfy a trip time to traverse the route.

14. The method according to claim 12, further comprising obtaining the route information at a plurality of intervals during the execution of the drive cycle along the route by the vehicle.

15. The method according to claim 12, wherein the velocity profile is predetermined based on one or more of: vehicle mass, vehicle drag, vehicle rolling resistance, resistive force at lower gear, tire circumference, vehicle front area.

16. The method according to claim 12, wherein the route information includes road terrain elements.

17. The method according to claim 16, wherein the road terrain element include one or more of: route grade, speed limit changes, off-ramp locations, fueling station locations, air density, traffic patterns, position and elevation.

18. The method according to claim 12, wherein the transmitted vehicle operating condition data comprises a recommendation based on the new velocity vector.

19. The method according to claim 18, wherein the recommendation includes a speed reference.

20. The method according to claim 18, wherein the recommendation includes a transmission gear.

21. The method according to claim 12, wherein the new velocity vector is determined based on current vehicle speed.

22. The method according to claim 12, wherein the new velocity vector is determined based on current transmission gear.

* * * * *